United States Patent
Chu

(10) Patent No.: US 10,895,982 B2
(45) Date of Patent: Jan. 19, 2021

(54) INPUT DEVICE AND SYMBOL DISPLAY METHOD THEREOF

(71) Applicant: E Ink Holdings Inc., Hsinchu (TW)

(72) Inventor: Chun-Wei Chu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/260,152

(22) Filed: Jan. 29, 2019

(65) Prior Publication Data

US 2019/0250817 A1 Aug. 15, 2019

(30) Foreign Application Priority Data

Feb. 14, 2018 (TW) ............................ 107105659 A

(51) Int. Cl.
G06F 3/0489 (2013.01)
G06F 3/0481 (2013.01)
G09G 5/32 (2006.01)

(52) U.S. Cl.
CPC ........ G06F 3/04897 (2013.01); G06F 3/0481 (2013.01); G09G 5/32 (2013.01); G09G 2340/0464 (2013.01)

(58) Field of Classification Search
CPC .... G06F 3/04897; G06F 3/0481; G06F 3/041; G09G 5/32
See application file for complete search history.

(56) References Cited

U.S. PATENT DOCUMENTS

| | | | |
|---|---|---|---|
| 6,295,052 B1 | 9/2001 | Kato et al. | |
| 9,041,656 B2 | 5/2015 | Lin | |
| 9,229,600 B2 | 1/2016 | Schmid | |
| 2001/0050671 A1* | 12/2001 | Ogawa | G06F 3/0238 345/156 |
| 2009/0273567 A1 | 11/2009 | Milley et al. | |
| 2010/0169834 A1* | 7/2010 | Wakizaka | G06F 3/04817 715/821 |
| 2011/0090151 A1* | 4/2011 | Huang | G06F 3/0237 345/168 |
| 2014/0082490 A1 | 3/2014 | Jung et al. | |
| 2016/0202778 A1 | 7/2016 | Su | |

FOREIGN PATENT DOCUMENTS

| | | |
|---|---|---|
| CN | 1627240 A | 6/2005 |
| CN | 102378950 A | 3/2012 |
| TW | 577599 U | 2/2004 |
| TW | M377645 U | 4/2010 |
| TW | 201407460 A | 2/2014 |
| TW | 201704937 A | 2/2017 |

OTHER PUBLICATIONS

Corresponding Taiwan office action dated Aug. 27, 2018.
Corresponding Taiwan office action dated Jan. 8, 2019.

* cited by examiner

*Primary Examiner* — Alexander Eisen
*Assistant Examiner* — Cory A Almeida
(74) *Attorney, Agent, or Firm* — CKC & Partners Co., LLC

(57) ABSTRACT

The present disclosure relates to an input device and a symbol display method thereof. The input device includes at least one button and a display unit. The display unit is arranged in a position adjacent to the button in the input device and includes multiple display regions. The positions of the display regions are corresponding to the positions of the button. The display unit displays multiple display symbols in the display regions. In addition, the display unit is configured to change the display position of at least one display symbol to a different display region according to a personalization signal.

18 Claims, 5 Drawing Sheets

INPUT DEVICE AND SYMBOL DISPLAY METHOD THEREOF

CROSS-REFERENCE TO RELATED APPLICATION

This application claims priority to Taiwan Application Serial Number 107105659, filed Feb. 14, 2018, which is herein incorporated by reference in its entirety.

BACKGROUND

Technical Field

The present disclosure relates to an input device. More particularly, the input device includes at least a button and a display unit.

Description of Related Art

For various electronic devices, the keyboard is one of the necessary input tools. In the traditional design, each button on the keyboard is printed with a specific symbol (e.g., characters, numbers, or punctuation marks) for identification by the user. Symbols are arranged in a predetermined way. This standardized design facilitates mass production. However, in the case where the number and positions of the buttons are fixed, the design flexibility of the keyboard or the electronic device will be limited.

SUMMARY

One aspect of the present disclosure is an input device. The input device includes at least one button and a display unit. The display unit is arranged in a position adjacent to the button on the input device, which includes a plurality of display regions. The positions of the display regions are corresponding to the position of the at least one button, wherein at least one display symbol is displayed on one of the display regions, and the display unit is configured to change the at least one display symbol according to a personalization signal.

Another aspect of the present disclosure is a symbol display method for an input device. The symbol display method includes the following steps. Displaying multiple display symbols in multiple display regions by a display unit of an input device. The positions of the display regions correspond to at least one button arranged on the input device. Changing at least one of the display symbols in the display regions according to a personalization signal.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
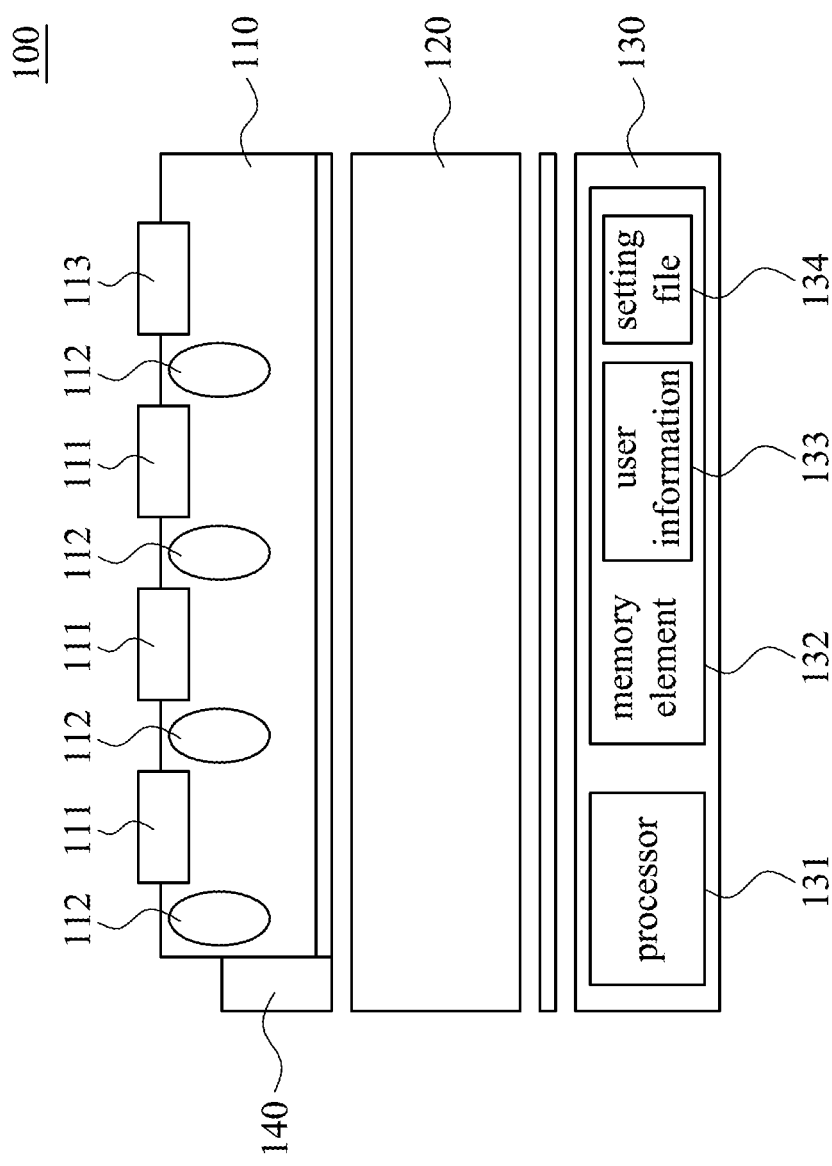
FIG. 1 is a schematic diagram of an input device in some embodiments of the present disclosure.

Refer to FIG. 1, which is a schematic diagram of an input device 100 according to some embodiments of the present disclosure. The input device 100 includes at least one button 111 and at least one display unit 120. In some embodiments, the button 111 is arranged on a keyboard element 110. The keyboard element 110 and the display unit 120 are assembled in the same device housing to facilitate carrying and use. The structure of the "keyboard component" can be arbitrarily adjusted and is not limited to the "keyboard" of the personal computer. The input device 100 may be a completely portable device, or also may be installed in a notebook computer or various electronic devices. In other embodiments, the input device 100 can be wired or wirelessly connected to the electronic device for data transmission.

Figure 2:
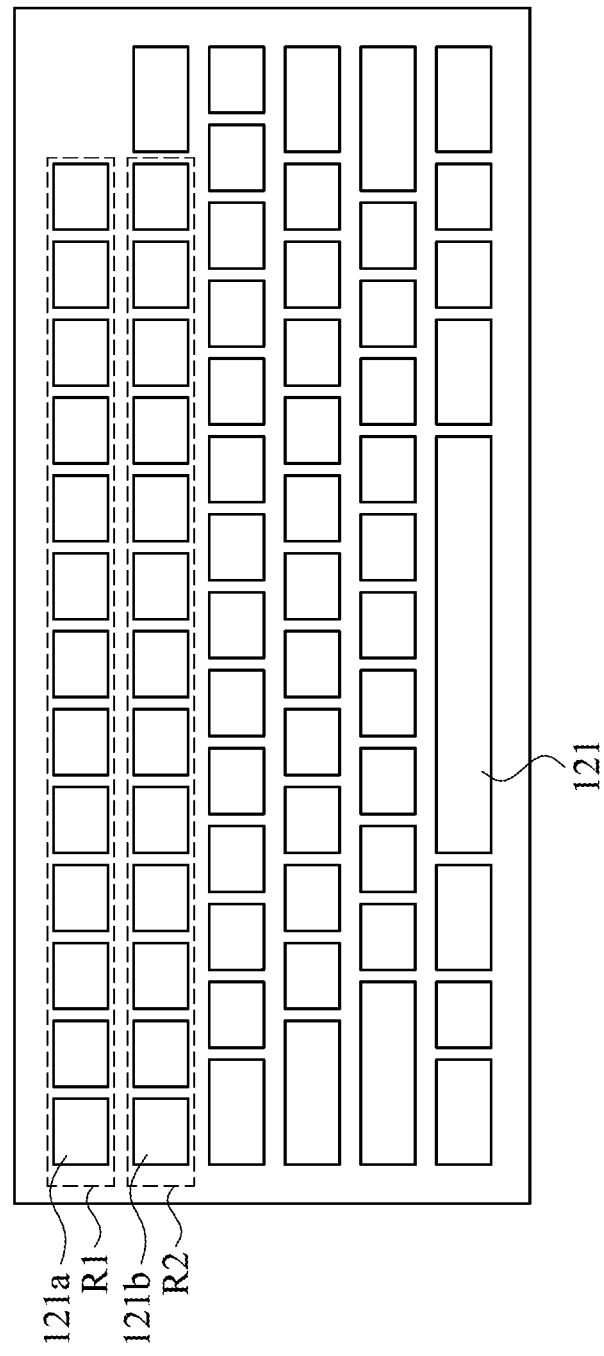
FIG. 2 is a schematic diagram of display regions in some embodiments of the present disclosure.

Refer to FIG. 1 and FIG. 2. In this embodiment, the keyboard element 110 includes multiple buttons 111. The display unit 120 is arranged in a position adjacent to the button 111 of the keyboard element 110 in the input device 100. The display unit 120 includes at least multiple display regions 121. The positions of the display regions 121 correspond to the buttons 111. In some embodiments, the display regions 121 are formed in the same display panel on the display unit 120. That is, the display regions 121 are display regions on the display panel. In other embodiments, the display regions 121 may also be arranged in different and independent display panels.

The display unit 120 is configured to display at least one display symbol (such as numbers, letters, characters, punctuation marks, etc., but not limited thereto) on the display regions 121. The display unit 120 is configured to change the display symbols in the display region 121 according to the personalization signal. For example, the display unit 120 changes the display position of at least one of the display symbols to a different display region 121 or changes the display content of the display symbol. In another embodiment, the user uses a switching device to control the display symbols in the display regions 121 changes. For example, change English symbols to Japanese symbols or phonetic symbols. Accordingly, the arrangement and content of the display symbols can be dynamically adjusted according to different users.

The personalization signal is a command input by the user (e.g., a password, a track of a touch signal), or a user's biometrics (e.g., facial features, fingerprints, voiceprints, etc.). In some embodiments, the input device 100 stores at least one corresponding user information 133. The user information 133 includes at least one data whose type is the same as the type of the personalization signal. When the input device 100 receives the personalization signal, the input device 100 determines whether the personalization signal is correct. If the input device 100 confirms that the personalization signal is correct, changing the displayed position of the display symbol. In some embodiments, the personalization signal is a set of passwords. The user enters a password through the buttons 111 on the keyboard element 110. If the input device 100 determines that the password (personalization signal) input by the user is the same as the internally stored password (user information 133), changing the display position of the displayed symbol based on the user information 133.

Figure 3:
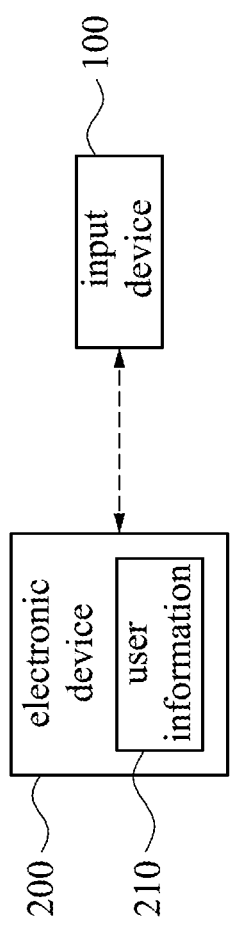
FIG. 3 is a schematic diagram of an input device and an electronic device in some embodiments of the present disclosure.

Refer to FIG. 3, which is a schematic diagram of some of the embodiments of this disclosure. In other embodiments, the input device 100 is connected to an electronic device (e.g., a tablet computer) to transmit a personalization signal (e.g., account and password of user) to the electronic device 200. The electronic device 200 determines the user information 210 corresponding to the personalization signal based on the multiple user information 210, and then transmits the user information 210 back to the input device 100 so that the input device 100 changes the display symbol according to the user information 210 (such as adjust the display position of the display symbol). In other embodiments, the electronic device 200 is connected to a server on the network, so that the input device 100 can find the corresponding user information through the electronic device 200 and the server. For example, the user can log in to the account of the cloud service by the input device 100 and the electronic device 200 to obtain the dedicated configuration file through the network and complete the setting of the input device 100.

In other embodiments, the input device 100 further includes a detection element (e.g., camera, fingerprint identification device). The personalization signal is a biometric data, such as an image signal (e.g., face recognition data), fingerprint signal or a voice print signal. After the input device gets the personalization signal of user by the detection element, compares and find the corresponding user information so as to complete the setting of the input device 100. As above, the user information can be stored in the input device 100, electronic device or the server.

In some other embodiments, the keyboard element 110 further includes a switch element 113 (e.g., a switch button) for transmitting the personalization signal so as to change the display symbol in the display region (e.g., change the display content). For example, the switch element 113 is a knob, when user rotates the knob to a particular angle, the knob generates a corresponding personalization signal.

In some embodiments, the input device further includes a control unit 130. The control unit 130 electrically coupled to the keyboard element 110 and the display unit 120, and the control unit 130 includes a processor 131 and a memory element 132. The memory element 132 is configured to store a setting file 134 and an user information 133. The setting file 134 records each display symbol and the corresponding display position. The processor 131 control the display unit 120 displays the display symbol in the display region 121 according to the setting file 134. The control unit 130 further sets the trigger signal of each button 111 as the display symbol in the corresponding display region 121 according to the setting file 134 and the corresponding relationship between the buttons 111 and the display regions 121. Accordingly, after the control unit 130 receives the personalization signal, the processor 131 find the corresponding user information 133 and adjusts the display symbol to the different display position, then, synchronously adjusts the setting file 134 so that the trigger signal of the corresponding button 111 can correspond to the new display symbol.

For example, the display symbol "@" whose position corresponds to the first buttons 111, the display symbol "#" whose position corresponds to the second button 111. When the input device 100 receives the personalization signal, the input device 100 adjusts the display position of the display symbol "@" to a display position which corresponding to the second button 111. At this time, the processor 131 modifies the trigger signal of the second button 111 to "@" instead of "#". Accordingly, the user can input the prospective symbol by the keyboard element 110 correctly.

Figure 4C:
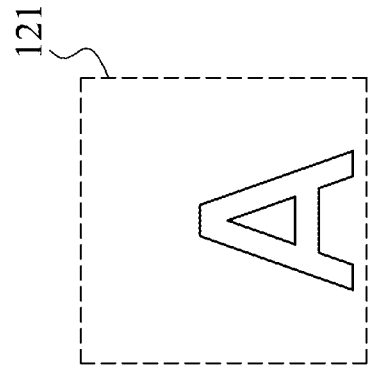
FIG. 4A-4C is a schematic diagram of a display symbol adjustment in some embodiments of the present disclosure.
Figure 4B:
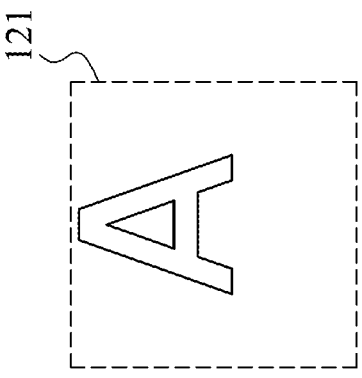
Figure 4A:
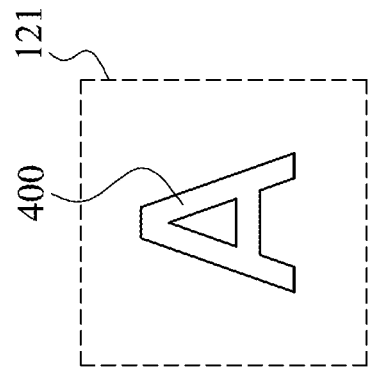

On the other hand, in some embodiments, the detection element 140 is configured to detect a distance between the input device 100 and an object (e.g., the distance between the input device 100 and the chest of the user) and to generate a detection signal. The control unit 130 adjusts the display position of the display symbol away from the object or toward the object according to the detection signal so as to improve the visibility of the display symbol on viewing. Refer to FIG. 4A-FIG. 4C, in some embodiments, the detection element 140 periodically detects the detection signal and the control unit 130 periodically receives the detection signal. The strength of the detection signal is used to represent the distance between the user and the input device 100. When the control unit 130 of the input device 100 determines that the detection signal increases, the input device 100 is configured to adjust the display position of the display symbol away from the object. When the control unit 130 of the input device 100 determines that the detection signal decreases, the input device 100 is configured to adjust the display position of the display symbol toward the object. For example, FIG. 4A shows a schematic diagram that the display symbol 400 is located at a preset position, that is, the display symbol 400 is located at the center of the display region 121. If the control unit 130 determines that the position of the user is away from the input device 100, the display unit 120 adjusts the display position of the display symbol 400 in the direction away from the user (e.g., the upward direction in FIG. 4A). In this way, even if the user is far away from the input device 100, the user can clearly see the display symbol 400 at the viewing angle. In the same way, when the position of the user approaches the input device 100, the display unit 120 adjusts the display position of the display symbol 400 in the direction toward the user (e.g., in the downward direction in FIG. 4A) to ensure that the user clearly sees the display symbol 400. In other embodiments, the control unit 130 compares the detection signal with a set range. If the detection signal is higher than the set range, the display positions of the display symbols 400 are adjusted away from the object. In contrast, the display position of the display symbols 400 is adjusted toward the object.

Refer to the FIG. 1, in some embodiments, the display regions 121 and the control unit 130 are arranged on the same side of the buttons 111. That is, the keyboard element 110 is disposed on the top of the input device 100. Therefore, the portions of the buttons 111 corresponding to the display regions 121 are translucent so that the user can see the display symbols under the buttons 111. In some embodiments, the keyboard element 110 includes multiple buttons 111 and a mechanical structure 112. The mechanical structure 112 is configured to displace the button 111 in the vertical direction. Person having ordinary skill in the art can understand how the mechanical structure 112 is set so it will not be described here. The button 111 made of a transparent material so as to avoid shadowing the display unit 120 under the button 111.

Figure 5:
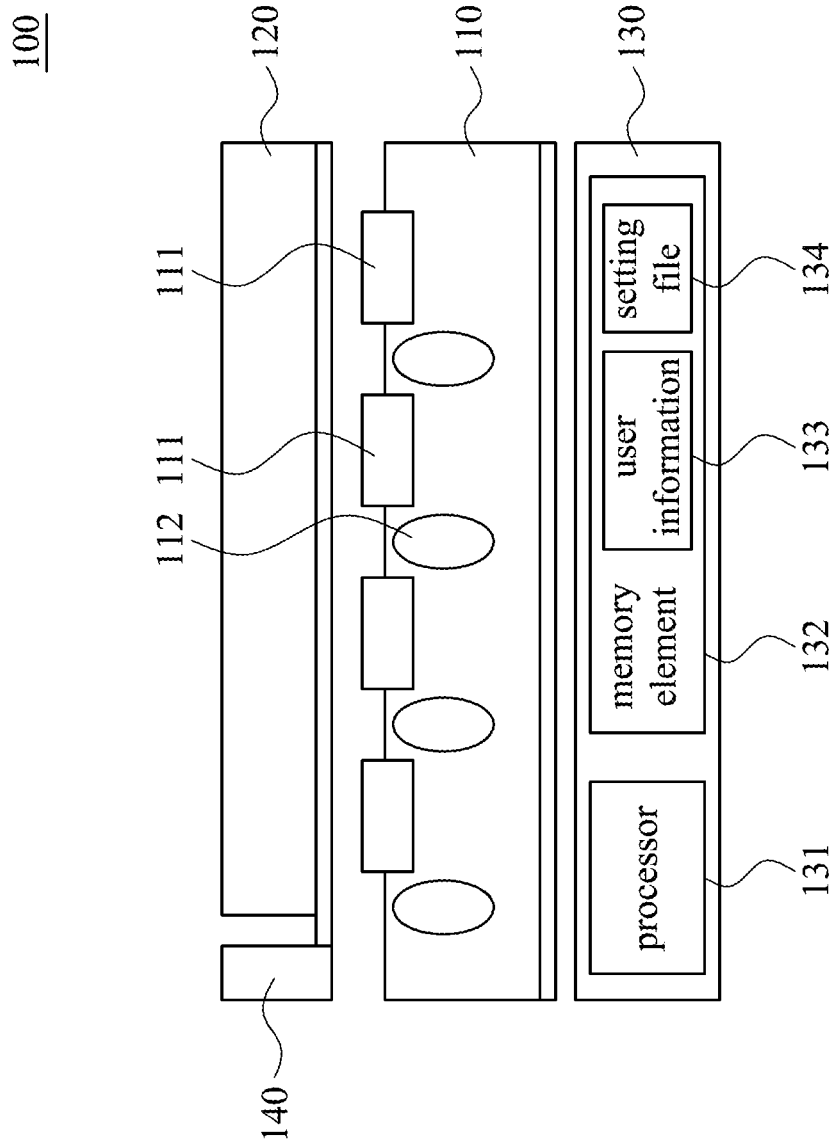
FIG. 5 is a schematic diagram of an input device in some embodiments of the present disclosure.

Referring to FIG. 5, in other embodiments, the display unit 120 and the control unit 130 are arranged on different sides of the buttons 111. That is, the display unit 120 is disposed above the keyboard element 110. In some embodiments, the display unit 120 is composed of a flexible display panel or a touch panel. In other embodiments, the display unit 120 includes multiple independent display panels, and each display panel is disposed on the buttons 111.

The input device of the present disclosure can also be applied to a notebook computer. The input device dynamically adjusts the display symbol to improve the configuration of the notebook computer. Referring to FIG. 2, in some embodiments, the display regions 121 of the display unit 120 are arranged in multiple rows. When receiving the personalization signal, the input device 100 simultaneously changes or adjusts the display positions of all the display symbols 400 in one of the rows of. In some embodiments, the display region 121 of the display unit 120 is arranged according to the position of the buttons, and the display unit 120 includes at least a first row region R1 and a second row region R2. The first row region R1 includes multiple display regions 121a arranged in sequence, and the second row region R2 has multiple display regions 121b arranged in sequence.

In one embodiment, the first row region R1 is configured to dispose function keys (e.g., F1 to F9, volume adjustment keys, brightness adjustment keys, etc.). The setting file in the input device 100 corresponds to the display symbol in the first row region R1. Therefore, when the input device 100 receives the personalization signal, it will automatically adjust the display position of the multiple display symbols in the first row region R1. For example, the original arrangement order of the display symbols in the first row region R1 is "F1, F2, brightness, volume". After receiving the personalization signal, the processor 131 adjusts the arrangement order of the display symbols to "volume, brightness", F1, F2" to respond to the user's personal habits.

In some embodiments, the display region 121a of the first row region R1 is configured to display function keys (e.g., F1 to F9, volume adjustment keys, brightness adjustment keys, etc.). The display region 121b of the second row region R2 is configured to display number keys (e.g., 1 to 9). Since the two rows of regions are configured to display symbols with low frequency of use, the input device 100 can combine and adjust the display positions of the display symbols from the two adjacent rows of the display regions 121a and 121b to the same row of display regions. Accordingly, each of the display regions 121 in the same row will simultaneously or sequentially display at least two of the display symbols. For example, the display symbols in the second row region R2 are merged into the first row region R1 so that multiple symbols such as "1/F1" and "2/F2" are displayed in each display. As a result, extra space can be configured to arrange other devices such as touchpads or batteries.

If the display positions of the adjacent two rows of display symbols are merged into the display regions 121 in the same row, when the user presses the corresponding button, the trigger signal generated by the button will correspond to at least two of the display symbols. At this time, the control unit 130 selects one of the display symbols in sequence according to the number of times that the trigger signal is received, and generates an input signal. For example, an input signal of "1" is output at the first press, and an input signal of "F1" is output at the second press. In other embodiments, the processor 131 sets one of the displayed symbols as a main symbol (e.g., 1) and the other display symbol is a minor symbol (e.g., F1). When the processor 131 receives the trigger signal, it will output the main symbol with priority. If the trigger signal and a switching signal (such as, switching function keys) are received at the same time, the secondary symbol is output.

In addition, here describes another embodiment of the present disclosure. Referring to FIG. 1 to FIG. 5, in some embodiments, a display region 121 simultaneously corresponds to multiple display symbols and different trigger signals. When the display positions of the multiple display symbols correspond to the same display region 121, the display unit 120 sequentially is configured to display the display symbols. When the input device 100 receives the confirmation signal, the input signal is generated according to the corresponding display symbol. For example, the display region 121 is set to correspond to three different display symbols "A, B, C". The display region 121 corresponds to a single button 111. When this button 111 is pressed, the display unit 120 sequentially displays these display symbols. For example, "A" is displayed on the first press, "B" is displayed on the second press, and "C" is displayed on the third press. In other embodiments, the display unit 120 may periodically change the displayed display symbol, such as change every three seconds.

As above, when the display unit 120 sequentially displays different display symbols, the user generates a confirmation signal by pressing the button 111 so that the input device 100 is configured to generate an input signal according to the currently displayed display symbol after receiving the confirmation signal. For example, when the display symbol displayed in the display region 121 is "A", the user quickly presses the corresponding button 111 multiple times within a predetermined time (e.g., 1 second) so that the keyboard element 110 determines that the confirmation signal is received, then, transmits the input signal of "A". The method of generating the confirmation signal is not limited to "multiple presses". It can also use "long press" or "press a switching element 113 at the same time."

Figure 6:
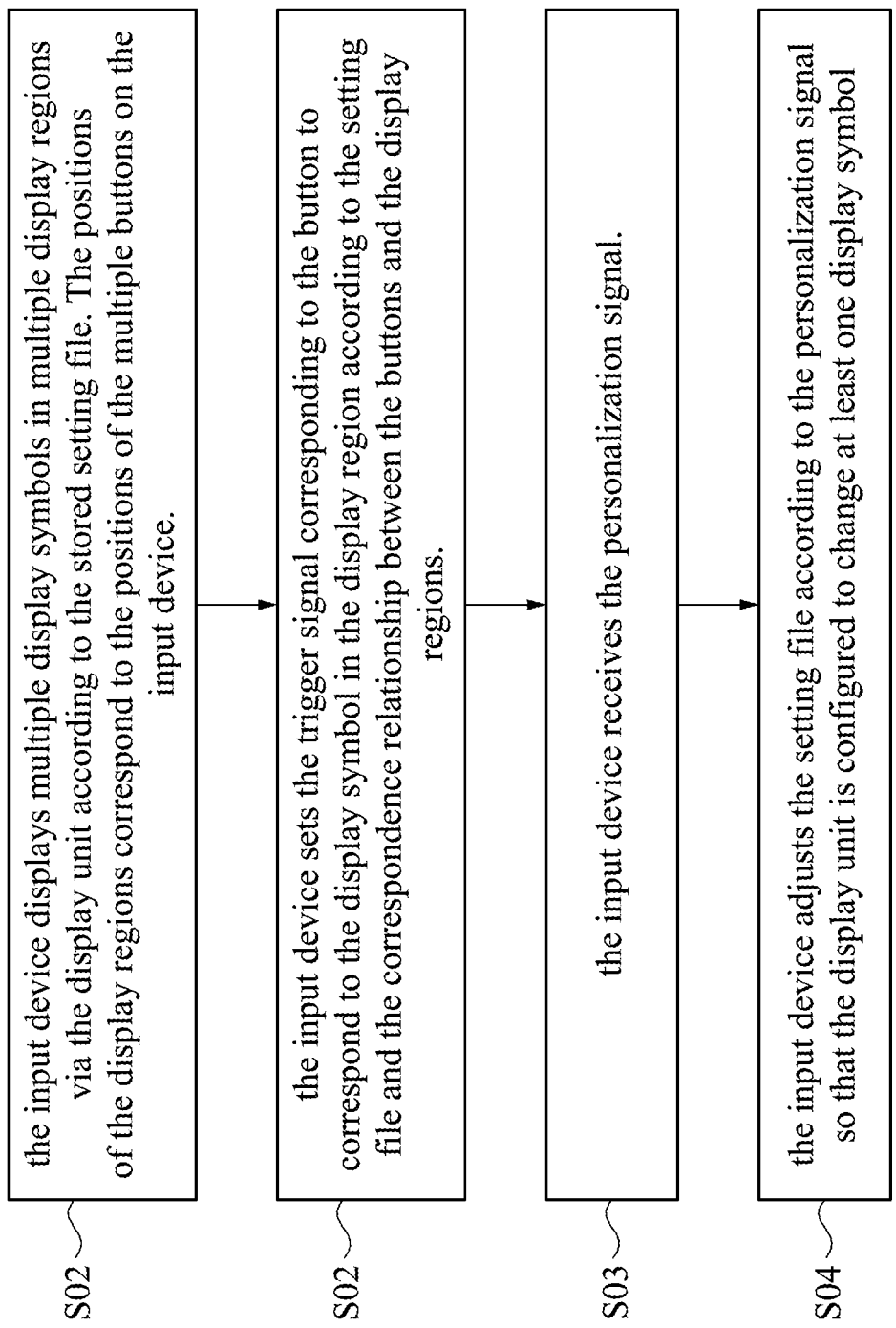
FIG. 6 is a flowchart illustrating a symbol display method in an embodiment of the present disclosure.

Refer to FIG. 6. FIG. 6 is a flowchart illustrating a symbol display method in an embodiment of the present disclosure. For clarity and convenience in the description, the following method for displaying symbols by the input device is described in correspondence with the embodiments shown in FIGS. 1 to 5, but not limited thereto. Person having ordinary skill in the art can make various changes and modifications without departing from the spirit and scope of this case. As shown in FIG. 6, the control method includes steps S01 to S04.

In step S01, the input device 100 displays multiple display symbols in multiple display regions 121 via the display unit 120 according to the stored setting file 134. The positions of the display regions 121 correspond to the positions of the multiple buttons 111 on the input device 100. For example, it is located above or below the button 111 or on the side of the button 111.

In step S02, the input device 100 sets the trigger signal corresponding to the button 111 to correspond to the display symbol in the display region 121 according to the setting file 134 and the correspondence relationship between the buttons 111 and the display regions 121.

In step S03, the input device 100 receives the personalization signal. In step S04, the input device 100 adjusts the setting file 134 according to the personalization signal so that the display unit 120 is configured to change at least one display symbol. For example, the display position of the display symbol will be adjusted from the original display region 121 to another display region 121.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An input device, comprising:
    a physical keyboard element comprising a plurality of buttons and a mechanical structure, wherein the mechanical structure is configured to displace the buttons in a vertical direction; and
    a display unit located under the plurality of buttons, wherein the display unit comprises a plurality of display regions to respectively display different display symbols, wherein positions of the plurality of display regions and positions of the plurality of buttons has a corresponding relationship,
    wherein when at least two display symbols corresponds to a same display region and a same button, the same display region is configured to sequentially display the at least two display symbols when the same button is pressed to generate a confirmation signal,
    wherein the input device further comprises a memory element configured to store at least one user information and a setting file, and
    the input device is configured to change display positions of the display symbols in the display regions according to the user information to rearrange the corresponding relationship between the buttons and the display regions, and
    the input device resets trigger signals of buttons as the display symbols in the corresponding display regions according to the setting file and the rearranged corresponding relationship between the buttons and the display regions.

2. The input device of claim 1, wherein the input device is configured to transmit the personalization signal to an electronic device and receive a user information from the electronic device, and change the at least one of the plurality of display symbols according to the user information.

3. The input device of claim 1, further comprising:
    a detection element configured to detect a distance between the input device and an object so as to generate a detection signal, wherein the input device is configured to adjust a display position of the at least one of the plurality of display symbols away from the object or toward the object according to the detection signal.

4. The input device of claim 3, wherein the detection element is configured to periodically detect the detection signal, when the input device determines that the detection signal increases, the input device is configured to adjust the display position of the at least one of the plurality of display symbols away from the object; when the input device determines that the detection signal decreases, the input device is configured to adjust the display position of at least one of the plurality of display symbols toward the object.

5. The input device of claim 1, further comprising:
    a control unit electrically coupled to the plurality of buttons and the display unit, wherein the plurality of display regions and the control unit are arranged on the same side of the plurality of buttons, and the portions of the plurality of buttons corresponding to the plurality of display regions is translucent.

6. The input device of claim 1, further comprising:
    a control unit electrically coupled to the plurality of buttons and the display unit, wherein the plurality of display regions and the control unit are arranged on different sides of the plurality of buttons.

7. The input device of claim 1, wherein the plurality of display regions are arranged in a plurality of rows, and the input device is configured to simultaneously change the display symbols in one of the rows of the plurality of display regions.

8. The input device of claim 1, wherein one of the plurality of display regions is configured to display two or more of the display symbols.

9. The input device of claim 1, wherein the display unit is configured to change a display position of the at least one of the plurality of display symbols or change a display content of the at least one of the plurality of display symbols according to the personalization signal.

10. The input device of claim 1, further comprising:
    a switch element configured to change a display content of the at least one of the plurality of display symbols displayed on one of the plurality of display regions.

11. A symbol display method for an input device as claimed in claim 1, comprising:
    displaying the plurality of display symbols in the plurality of display regions by the display unit of the input device, wherein positions of the plurality of display regions are corresponding to a plurality of buttons, and the plurality of buttons are arranged on the physical keyboard element; and
    changing at least one of the plurality of display symbols in one of the plurality of display regions according to the personalization signal.

12. The symbol display method for an input device of claim 11, further comprising:
    when determining the personalization signal corresponds to a user information, changing the at least one of the plurality of display symbols according to the user information by the input device.

13. The symbol display method for an input device of claim 11, further comprising:
    transmitting the personalization signal to an electronic device by the input device;
    receiving a user information from the electronic device; and
    changing the at least one of the plurality of display symbols according to the user information.

14. The symbol display method for an input device of claim 11, further comprising:
    receiving a detection signal, wherein the detection signal is configured to determine a distance between the input device and an object; and
    adjusting a display position of the at least one of the plurality of display symbols away from the object or toward the object according to the detection signal.

15. The symbol display method for an input device of claim 14, wherein the input device periodically receives the detection signal, and the symbol display method further comprises:

adjusting the display position of the at least one of the plurality of display symbols away from the object when determining that the detection signal increases; and adjusting the display position of the at least one of the plurality of display symbols toward the object when determining that the detection signal decreases.

16. The symbol display method for an input device of claim 11, wherein the plurality of display regions are arranged in a plurality of rows, and the symbol display method further comprises:

changing display positions of the plurality of display symbols in one of the rows of the plurality of display regions simultaneously.

17. The symbol display method for an input device of claim 16, further comprising:

combining and adjusting the display positions of the plurality of display symbols from the two adjacent rows of the plurality of display regions to the same row so that each of the plurality of display regions of the same row is configured to display at least two of the display symbols.

18. The symbol display method for an input device of claim 11, further comprising:

displaying the plurality of display symbols sequentially by the display unit when display positions of the plurality of display symbols correspond to the same display region; and receiving a confirmation signal by the input device, and generating an input signal according to the corresponding display symbol.

* * * * *